United States Patent
Massari et al.

(10) Patent No.: US 10,155,827 B2
(45) Date of Patent: *Dec. 18, 2018

(54) RANDOM PROPYLENE-ETHYLENE COPOLYMERS

(71) Applicant: BASELL POLIOLEFINE ITALIA S.R.L., Milan (IT)

(72) Inventors: Paola Massari, Ferrara (IT); Fabrizio Piemontesi, Ferrara (IT); Gianni Vitale, Ferrara (IT); Caroline Cathelin, Ferrara (FR); Giampiero Morini, Ferrara (IT); Marco Ciarafoni, Ferrara (IT); Claudio Cavalieri, Ferrara (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/309,138

(22) PCT Filed: Apr. 28, 2015

(86) PCT No.: PCT/EP2015/059247
§ 371 (c)(1),
(2) Date: Nov. 4, 2016

(87) PCT Pub. No.: WO2015/169653
PCT Pub. Date: Nov. 12, 2015

(65) Prior Publication Data
US 2017/0066855 A1    Mar. 9, 2017

(30) Foreign Application Priority Data

May 6, 2014   (EP) ..................................... 14167178
Apr. 17, 2015  (EP) ..................................... 15164016

(51) Int. Cl.
*C08F 210/02* (2006.01)
*C08F 210/06* (2006.01)
*C08J 5/18* (2006.01)

(52) U.S. Cl.
CPC ............... *C08F 210/06* (2013.01); *C08J 5/18* (2013.01); *C08F 210/02* (2013.01); *C08F 2800/20* (2013.01); *C08J 2323/14* (2013.01)

(58) Field of Classification Search
None
See application file for complete search history.

(56) References Cited

U.S. PATENT DOCUMENTS

| | | | |
|---|---|---|---|
| 9,676,883 B2 * | 6/2017 | Piemontesi | C08F 210/06 |
| 2002/0137860 A1 | 9/2002 | Collina et al. | |
| 2007/0202285 A1 * | 8/2007 | Burmaster | C08F 210/06 |
| | | | 428/35.7 |
| 2009/0176902 A1 * | 7/2009 | Stadlbauer | C08F 10/06 |
| | | | 521/79 |
| 2017/0166711 A1 | 6/2017 | Boragno et al. | |

FOREIGN PATENT DOCUMENTS

| | | |
|---|---|---|
| CN | 106255718 A | 12/2016 |
| EP | 1900764 A1 | 3/2008 |
| EP | 1903070 A1 | 3/2008 |
| WO | WO-2007045600 A1 | 4/2007 |

OTHER PUBLICATIONS

PCT International Search Report and the Written Opinion—dated Aug. 6, 2015 (Aug. 6, 2015) for Corresponding PCT/EP2015/059247.

* cited by examiner

*Primary Examiner* — Richard A Huhn

(57) ABSTRACT

The present disclosure relates to a propylene ethylene copolymer comprising:
an ethylene content of between 1.8 and 10.0% by weight;
a molecular weight distribution (MWD), expressed in terms of Mw/Mn, greater than 4.0;
a content of xylene soluble fraction (XS) and ethylene content (C2) that fulfills the following relationship:

$$XS < (C2 \times 2.1) - 2.4$$

where:
$XS = \%$ by weight of the fraction soluble in xylene at 25° C.; and
$C2 = \%$ by weight of ethylene units in the copolymer as determined via NMR.

5 Claims, No Drawings

RANDOM PROPYLENE-ETHYLENE COPOLYMERS

This application is the U.S. National Phase of PCT International Application PCT/EP2015/059247, filed Apr. 28, 2015, claiming benefit of priority to European Patent Application No. 14167178.4, filed May 6, 2014 and European Patent Application No. 15164016.6 filed Apr. 17, 2015, the contents of which are incorporated herein by reference in its entirety.

FIELD OF THE INVENTION

The present disclosure relates to random propylene/ethylene copolymers which have excellent properties such as low concentrations of xylene-solubles, and improved melting temperatures and optical properties. The random propylene/ethylene copolymers described herein may be used for the production of improved films such as cast films.

BACKGROUND OF THE INVENTION

Propylene copolymers containing from 0.1 to 10 by weight of ethylene, in which the comonomer is randomly distributed in the polypropylene chain, are known as random propylene copolymers. Compared with propylene homopolymers, these copolymers have molecular structures that are modified by the presence of the comonomer, leading to a substantially lower degree of crystallinity. As a result, random copolymers have a lower melting temperature with respect to propylene homopolymers, as well as lower sealing temperatures and moduli of elasticity.

However, the introduction of the comonomer into the polypropylene chain can leads to significant increases in the fraction of polymer which is soluble in xylene at 25° C., with the soluble polymer portion comprising low molecular weight chains and percentages of comonomer which are higher than the average content of comonomer as calculated for the whole polymer. The amount of xylene soluble fraction generally increases as the content of comonomer in the copolymer increases and, beyond defined limits, precludes the use of the copolymers in certain sectors, for example in the preparation of films for food applications, unless recourse is made by the elimination of the xylene soluble fraction. The presence of relevant amounts of the xylene soluble fractions decreases the flowability of the polymer granules, thereby making operations such as discharging and transferring the polymer difficult and giving rise to operational problems in the polymerization plant. Moreover, the presence of the xylene soluble fractions in significant amounts leads, over time, to phenomena such as the deterioration of the film's optical properties and organoleptic properties related to the migration of these fractions to the surface (known as blooming).

It is known in the relevant art that random propylene copolymers with improved comonomer distributions may be obtained using single-site catalysts.

For instance, WIPO Pat. App. Pub. No. WO 2007/45600 relates to random propylene copolymers having high melt flow rates for injection molding and melt blowing applications. The copolymers described therein have a melt flow rate ranging from 90 to 3000 g/10 min and a distribution of molecular weight of lower than 4. This material is obtained by using metallocene-based catalyst system. Even if the xylene solubles of this material is less than 2.2, the other features of the copolymers, such as the high melt flow rate and the narrow distribution of molecular weight, reduces the effectiveness of these materials for the production of cast films.

WIPO Pat. App. Pub. No. WO 2006/120190 relates to random propylene/ethylene copolymers having an ethylene content ranging from 4.5 to 7 wt % and a Mw/Mn of lower than 4. The copolymers described in this document shows very low levels of xylene solubles after visbreaking; however, the xylene solubles of the ex reactor polymers are comparatively high.

U.S. Pat. No. 6,365,685 (and WIPO Pat. App. Pub. No. WO 97/31954) relates to propylene random copolymers obtained by using a phthalate based catalyst in combination with certain 1,3-diethers as external donors. The random propylene polymers described therein are improved with respect to those obtained with the same phthalate-based ZN catalysts using silanes as external donors. However, the properties of the random copolymers still need to be improved, particularly as the xylene solubles content reported in the patent is determined by a method comprising dissolving the whole sample at the xylene boiling point, lowering the temperature of the solution to 0° C. and allowing the temperature to increase to 25° C. This method as shown in the Comparative Examples of the document gives rise to lower values of xylene solubles.

SUMMARY OF THE INVENTION

The present disclosure relates to improved propylene/ethylene copolymers, obtained by heterogeneous catalysts, having improved comonomer distributions which allow for enhanced low sealing initiation temperatures, increased transparency and reduced xylene soluble contents.

In some embodiments, the propylene ethylene copolymers of the present disclosure are characterized by the following features:
  an ethylene content of between 1.8 and 10.0% by weight;
  a molecular weight distribution (MWD), expressed in terms of Mw/Mn, of greater than 4.0; and
  a content of xylene soluble fraction (XS) and ethylene content (C2) that fulfills the following relationship:

$$XS < (C2 \times 2.1) - 2.4$$

where:
XS=% by weight of the fraction soluble in xylene at 25° C. as determined according to the method given in the characterization section; and
C2=% by weight of ethylene units in the copolymer as determined via NMR according to the method given in the characterization section.

DETAILED DESCRIPTION OF THE INVENTION

The propylene ethylene copolymers of the present disclosure are characterized by the following features:
  an ethylene content comprised between 1.8 and 10.0% by weight; such as between 2.1 and 7.1 wt %; between 2.7 wt % and 6.3 wt %; and between 2.9 and 5.3 wt %;
  a molecular weight distribution (MWD), expressed in terms of Mw/Mn, of greater than 4.0 and lower than 10;
  a content of xylene soluble fraction (XS) and ethylene content (C2) that fulfills the following relationship:

$$XS < (C2 \times 2.1) - 2.4$$

where:

XS=% by weight of the fraction soluble in xylene at 25° C. as determined according to the method given in the characterization section; and C2=% by weight of ethylene units in the copolymer as determined via NMR according to the method given in the characterization section;

In certain embodiments, the relationship is defined as:

XS<(C2×2.1)−2.6 alternatively, as:

XS<(C2×2.1)−2.8 and alternatively, as:

XS<(C2×2.1)−3.0.

The propylene ethylene copolymer of the present disclosure comprises propylene and ethylene comonomers.

In some embodiments, in the propylene/ethylene copolymer the melt flow rate (MFR, 230° C. 2.16 kg), referring to the copolymers as a reactor grade (i.e., as copolymers that have not been subjected to chemical or physical visbreaking) ranges from 0.5 to 75 g/10 min; from 2.0 to 25.0 g/10 min; from 3.0 to 20.0 g/10 min; and from 4.0 to 18.0 g/10 min.

In further embodiments, in the propylene/ethylene copolymer the 2,1 propylene insertions cannot be detected via $^{13}$C NMR according to the procedure reported in the characterizing section.

In certain embodiments, the propylene ethylene copolymer described herein is beneficial for the production of films such as cast films. The cast film obtained using the propylene ethylene polymer described herein has good optical properties (in a non-nucleated form), including a haze value as measured on a 50 micron cast film of lower than 0.40%, including lower than 0.30%; and lower than 0.25%; and further comprising a low seal initiation temperature (SIT).

In some embodiments, the difference between the melting point and the SIT is higher than 17° C.; such as higher than 18° C. and higher than 19° C.

In some embodiments, the disclosed propylene ethylene copolymer can be prepared by a process comprising polymerizing propylene with ethylene, in the presence of a catalyst comprising the product of the reaction between:

(i) a solid catalyst component comprising Ti, Mg, Cl, and an electron donor compound comprising from 0.1 to 50% wt. of Bi with respect to the total weight of the solid catalyst component;

(ii) an alkylaluminum compound; and (iii) an electron-donor compound (external donor).

In certain embodiments, in the catalyst component the content of Bi ranges from 0.5 to 40% wt., from 1 to 35% wt., from 2 to 25% wt. and from 2 to 20% wt.

The particles of the solid catalyst component have substantially spherical morphologies and average diameters ranging from 5 and 150 μm, from 20 to 100 μm and from 30 to 90 μm. As defined herein, "particles having substantially spherical morphologies" means the ratio between the greater axis and the smaller axis is equal to or lower than 1.5, such as lower than 1.3.

In further embodiments, the amount of Mg in the solid catalyst component ranges from 8 to 30% wt., such as from 10 to 25% wt.

Generally, the amount of Ti ranges from 0.5 to 5% wt., including from 0.7 to 3% wt.

In some embodiments, internal electron donor compounds are selected from alkyl and aryl esters of optionally substituted aromatic polycarboxylic acids, such as esters of benzoic and phthalic acids. Specific examples of such esters are n-butylphthalate, di-isobutylphthalate, di-n-octylphthalate, ethyl-benzoate and p-ethoxy ethyl-benzoate.

In certain embodiments, the Mg/Ti molar ratio is equal to, or higher than, 13, such as in the range of 14 to 40 and 15 to 40. Correspondingly, in further embodiments the Mg/donor molar ratio is higher than 16, higher than 17 and ranging from 18 to 50.

The Bi atoms may derive from one or more Bi compounds not having Bi-carbon bonds. In some embodiments, the Bi compounds can be selected from Bi halides, Bi carbonate, Bi acetate, Bi nitrate, Bi oxide, Bi sulfate, and Bi sulfide compounds, including those in which Bi has a valence of +3. In further embodiments, the Bi halides are selected from Bi trichloride and Bi tribromide, such as $BiCl_3$.

The preparation of the solid catalyst component can be carried out according to several methods.

According to one method, the solid catalyst component can be prepared by reacting a titanium compound of the formula $Ti(OR)_{q-y}X_y$, where q is the valence of titanium and y is a number between 1 and q, such as $TiCl_4$, with a magnesium chloride ($MgCl_2$) deriving from an adduct of the formula $MgCl_2 \cdot pROH$, where p is a number between 0.1 and 6, including from 2 to 3.5, and R is a hydrocarbon radical having 1-18 carbon atoms. The adduct can be prepared in spherical form by mixing alcohol and magnesium chloride under stirring conditions at the melting temperature of the adduct (100-130° C.). Then, the adduct can be mixed with an inert hydrocarbon immiscible with the adduct, thereby creating an emulsion which is quickly quenched, causing the solidification of the adduct in the form of spherical particles. Examples of spherical adducts prepared according to this procedure are described in U.S. Pat. Nos. 4,399,054 and 4,469,648. The adducts can be directly reacted with a Ti compound or subjected to thermally controlled dealcoholation (80-130° C.) to obtain an adduct in which the number of moles of alcohol is generally lower than 3, such as between 0.1 and 2.5. The reaction with the Ti compound can be carried out by suspending the adduct (optionally dealcoholated) in cold $TiCl_4$ (generally around 0° C.); the mixture is heated up to 80-130° C. and kept at this temperature for 0.5-2 hours. The treatment with $TiCl_4$ can be carried out one or more times. The electron donor compound can be added in the desired ratios during the treatment with $TiCl_4$.

Several ways are available to add one or more Bi compounds in the catalyst preparation. According to the one option, the Bi compound(s) is/are incorporated directly into the $MgCl_2 \cdot pROH$ adduct during its preparation. For instance, the Bi compound can be added at the initial stage of adduct preparation by mixing it together with $MgCl_2$ and the alcohol. Alternatively, it can be added to the molten adduct before the emulsification step. The amount of Bi introduced ranges from 0.1 to 1 mole per mole of Mg in the adduct. In certain embodiments, Bi compound(s) that may be directly formulated into the $MgCl_2 \cdot pROH$ adduct are Bi halides such as $BiCl_3$.

In additional embodiments, the alkyl-Al compound (ii) is chosen from among the trialkyl aluminum compounds such as triethylaluminum, triisobutylaluminum, tri-n-butylaluminum, tri-n-hexylaluminum, and tri-n-octylaluminum. It is also possible to use alkylaluminum halides, alkylaluminum hydrides and alkylaluminum sesquichlorides such as $AlEt_2Cl$ and $Al_2Et_3Cl_3$, optionally in mixtures with the above cited trialkylaluminum compounds. In some embodiments, the Al/Ti ratio is higher than 1 and is generally comprised between 50 and 2000.

External electron-donor compounds for use in the present technology include silicon compounds, ethers, esters, amines, heterocyclic compounds, 2,2,6,6-tetramethylpiperidine and ketones.

Silicon compounds of the formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatom, may be used as external electron donors. Silicon compounds in which a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group, such as a methyl group, may be used. Examples of such silicon compounds are methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)-(2-ethylpiperidinyl)-dimethoxysilane, and methyl(3,3,3-trifluoro-n-propyl)dimethoxysilane. Moreover, silicon compounds in which a is 0, c is 3, $R_7$ is a branched alkyl or cycloalkyl group, optionally containing heteroatoms, and $R_8$ is methyl may be used. Examples of such silicon compounds are cyclohexyltrimethoxysilane, t-butyltrimethoxysilane and thexyltrimethoxysilane.

The electron donor compound (iii) is used in such an amount to give a weight ratio between the organoaluminum compound and the electron donor compound (iii) of from 2.5 to 500, such as from 3 to 300 and from 3.5 to 100.

The polymerization process can be carried out according to known techniques, for example, slurry polymerization using an inert hydrocarbon solvent as a diluent, or bulk polymerization using a liquid monomer (for example, propylene) as a reaction medium. Moreover, it is possible to carry out the polymerization process in gas-phase using one or more fluidized or mechanically agitated bed reactors.

In certain embodiments, the polymerization is carried out at a temperature from 20 to 120° C., such as from 40 to 80° C. When the polymerization is carried out in gas-phase, the operating pressure may be between 0.5 and 5 MPa, including between 1 and 4 MPa. In bulk polymerization, the operating pressure may be between 1 and 8 MPa, such as between 1.5 and 5 MPa. Hydrogen may be used as a molecular weight regulator.

The following examples are given in order to better illustrate the present technology and are not intended to limit it in any way.

EXAMPLES

Determination of Mg, Ti

The determination of Mg and Ti content in the solid catalyst component has been carried out via inductively coupled plasma (ICP) emission spectroscopy on an ARL Accuris ICP spectrometer.

The sample was prepared by analytically weighting, in a "Fluxy" platinum crucible", 0.1-0.3 grams of catalyst and 2 grams of lithium metaborate/tetraborate in a 1:1 mixture. After the addition of some drops of potassium iodide (KI) solution, the crucible is inserted in a special apparatus "Claisse Fluxy" for the complete burning. The residue is collected with a 5% v/v $HNO_3$ solution and then analyzed via ICP at the following wavelengths: magnesium—279.08 nm; titanium—368.52 nm.

Determination of Bi

The determination of Bi content in the solid catalyst component has been carried out via inductively coupled plasma emission spectroscopy (ICP) emission spectroscopy on an ARL Accuris ICP spectrometer.

The sample was prepared by analytically weighing, in a 200 cm³ volumetric flask, 0.1-0.3 grams of catalyst. After slow addition of both ca. 10 milliliters of 65% v/v $HNO_3$ solution and ca. 50 cm³ of distilled water, the sample undergoes a digestion for 4-6 hours. Then the volumetric flask is diluted to the 200 cm³ mark with deionized water. The resulting solution is directly analyzed via ICP at the following wavelength: bismuth—223.06 nm.

Determination of Internal Electron Donor Content

The determination of the content of internal electron donor in the solid catalytic compound was done through gas chromatography. The solid catalytic compound was dissolved in acetone, an internal standard was added, and a sample of the organic phase of the mixture was analyzed in a gas chromatograph to determine the amount of donor present in the starting catalyst compound.

Determination of Xylene Insolubility (X.I.)

The xylene soluble (X.S.) fraction was measured according to ASTM ISO 16152, 2005, but with the following deviations (deviations from the ISO 16152 published method are in brackets):

i—The solution volume is 250 ml (200 ml);
ii—During the precipitation stage at 25° C. for 30 min, the solution is kept under agitation by a magnetic stirrer for the final 10 min (30 min, without stirring); and
iii—The final drying step is done under vacuum at 70° C. (100° C.). The content of xylene-soluble fraction is expressed as a percentage of the original 2.5 grams and then, by the difference (complementary to 100%), the xylene insoluble percentage (X.I. %) is determined.

Molecular Weight Distribution (Mw/Mn)

Molecular weights and molecular weight distributions were measured at 150° C. using a Waters Alliance GPCV/2000 instrument equipped with four mixed-bed columns (PLgel Olexis) having an average particle size of 13 μm. The dimensions of the columns were 300×7.8 mm. The mobile phase used was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol were added. 300 μl of solution were injected into the column set. A calibration curve was obtained using 10 polystyrene standard samples (EasiCal kit by Agilent) with molecular weights in the range from 580 to 7 500 000. It was assumed that the K values of the Mark-Houwink relationship were:

$K=1.21\times10^4$ dl/g and $\alpha=0.706$ for the polystyrene standards, and
$K=1.90\times10^4$ dl/g and $\alpha=0.725$ for the experimental samples.

A third-order polynomial fit was used for interpolating the experimental data and obtaining the calibration curve. Data acquisition and processing were performed using Waters Empowers 3 Chromatography Data Software with a GPC option.

Melt Flow Rate (MIL)

The melt flow rate (MIL) of the polymer was determined according to ASTM ISO 1133 (230° C., 2.16 kg).

$^{13}$C NMR of Propylene/Ethylene Copolymers $^{13}$C NMR spectra were acquired on a Bruker AV-600 spectrometer equipped with a cryoprobe, operating at 160.91 MHz, in Fourier transform mode at 120° C.

The peak of the $S_{\beta\beta}$ carbon (nomenclature according to "Monomer Sequence Distribution in Ethylene-Propylene Rubber Measured by $^{13}$C NMR. 3. Use of Reaction Probability Mode," C. J. Carman, R. A. Harrington and C. E. Wilkes, *Macromolecules*, 1977, 10, 536) was used as an internal reference at 29.9 ppm. The samples were dissolved in 1,1,2,2-tetrachloroethane-d2 at 120° C. with an 8% w/v concentration. Each spectrum was acquired with a 90° pulse, 15 seconds of delay between pulses and CPD to remove $^{1}H$-$^{13}C$ coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride," M. Kakugo, Y. Naito, K. Mizunuma and T. Miyatake, *Macromolecules*, 1982, 15, 1150) using the following equations:

$$PPP=100T_{\beta\beta}/S \quad PPE=100T_{\beta\delta}/S \quad EPE=100T_{\delta\delta}/S$$

$$PEP=100S_{\beta\beta}/S \quad PEE=100S_{\beta\delta}/S \quad EEE=100(0.25S_{\gamma\delta}+0.5S_{\delta\delta})/S$$

$$S=T_{\beta\beta}+T_{\beta\delta}+T_{\delta\delta}+S_{\beta\beta}+S_{\beta\delta}+0.25S_{\gamma\delta}+0.5S_{\delta\delta}$$

The molar percentage of ethylene content was evaluated using the following equation:

$E$% mol=$100*[PEP+PEE+EEE]$. The weight percentage of ethylene content was evaluated using the following equation:

$$E\% \text{ wt.} = \frac{100*E\% \text{ mol}*MW_E}{E\% \text{ mol}*MW_E + P\% \text{ mol}*MW_P}$$

where $P\%$ mol is the molar percentage of propylene content, while $MW_E$ and $MW_P$ are the molecular weights of ethylene and propylene, respectively.

The product of reactivity ratio $r_1 r_2$ was calculated according to Carman (C. J. Carman, R. A. Harrington and C. E. Wilkes, *Macromolecules*, 1977; 10, 536) as:

$$r_1 r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of propylene sequences was calculated as mm content from the ratio of the PPP mm$T_{\beta\beta}$ (28.90-29.65 ppm) and the whole $T_{\beta\beta}$ (29.80-28.37 ppm)

Determination of the Regioinversions:

Determined by means of $^{13}$C-NMR according to the methodology described by J. C. Randall in "Polymer sequence determination Carbon 13 NMR method", Academic Press, 1977. The content of regioinversions is calculated on the basis of the relative concentration of $S_{\alpha\beta}+S_{\beta\beta}$ methylene sequences.

Melting Temperature via Differential Scanning Calorimetry (DSC)

The melting points of the polymers (Tm) were measured by Differential Scanning Calorimetry (D.S.C.) on a Perkin Elmer DSC-1 calorimeter, previously calibrated against indium melting points, and according to ASTM ISO 11357-1, 2009 and ASTM ISO 11357-3, 2011, at 20° C./min. The weight of the samples in every DSC crucible was kept at 6.0±0.5 mg. In order to obtain the melting point, the weighted sample was sealed in aluminum pans and heated to 200° C. at 20° C./minute. The sample was kept at 200° C. for 2 minutes to allow a complete melting of all the crystallites, then cooled to 5° C. at 20° C./minute. After standing for 2 minutes at 5° C., the sample was heated for the second run time to 200° C. at 20° C./min. In this second heating run, the peak temperature (Tp,m) was taken as the melting temperature.

Seal Initiation Temperature (SIT) and Preparation of the Film Specimens

Films with a thickness of 50 µm are prepared by extruding each test composition in a single screw Collin extruder (length/diameter ratio of screw: 1:25) at a film drawing speed of 7 m/min and a melt temperature of 210-250° C. Each resulting film is superimposed on a 1000 µm thick film of a propylene homopolymer having a xylene insoluble fraction of 97 wt % and a MFR L of 2 g/10 min. The superimposed films are bonded to each other in a Carver press at 200° C. under a 9000 kg load, which is maintained for 5 minutes. The resulting laminates are stretched longitudinally and transversally, i.e. biaxially, by a factor of 6 with a TOM long film stretcher at 150° C. for obtaining a 20 µm thick film (18 µm homopolymer+2 µm test). 2×5 cm specimens are cut from the films.

Determination of the SIT

For each test, two of the above specimens are superimposed in alignment, the adjacent layers being layers of the particular test composition. The superimposed specimens are sealed along one of the 2 cm sides with a Brugger Feinmechanik Sealer, Model HSG-ETK 745. The sealing time is 5 seconds at a pressure of 0.1 N/mm². The sealing temperature is increased by 2° C. for each seal, starting from about 10° C. less than the melting temperature of the test composition. The sealed samples are left to cool and then their unsealed ends are attached to an Instron machine where they are tested at a traction speed of 50 mm/min.

The SIT is the minimum sealing temperature at which the seal does not break when a load of at least 2 Newtons is applied in the test conditions.

Determination of the Haze

50 µm film specimens prepared as described above for the SIT measure have been used. The haze value is measured using a Gardner photometric unit connected to a Hazemeter Type UX-10 or an equivalent instrument having a G.E. 1209 light source with filter "C". Reference samples of known haze are used for calibrating the instrument.

Procedure for the Preparation of the Spherical Adduct

The microspheroidal MgCl$_2$.pC$_2$H$_5$OH adduct was prepared according to the method described in Comparative Example 5 of WIPO Pat. App. Pub. No. WO 98/44009, with the difference that BiCl$_3$ was in powder form and 3 mol % with respect to the magnesium has been added before feeding of the oil. The adduct contains 11.2 wt. % of Mg.

Procedure for the Preparation of the Solid Catalyst Component

Into a 300 L jacketed reactor, equipped with a mechanical stirrer, condenser and thermocouple, 200 L of TiCl$_4$ were introduced at room temperature under a nitrogen atmosphere. After cooling to 0° C., while stirring, diisobutylphthalate and 8 kg of the spherical adduct (prepared as described above) were sequentially added. The amount of charged internal donor was such to meet a Mg/donor molar ratio of 8. The temperature was raised to 100° C. and maintained for 1 hour. Thereafter, stirring was stopped, the solid product was allowed to settle and the supernatant liquid was siphoned off at 100° C. After the supernatant was removed, additional fresh TiCl$_4$ was added to reach the initial liquid volume again. The mixture was then heated to 120° C. and kept at this temperature for 0.5 hours. Stirring was stopped again, the solid was allowed to settle and the supernatant liquid was siphoned off at 120° C. The treatment with TiCl$_4$ at 120° C. was then repeated again with the same procedure as before but the treatment time was decreased to 15 minutes. The solid was washed with anhydrous hexane six times in a temperature gradient down to 60° C. and one time at room temperature. The solid was then dried under vacuum.

Propylene/Ethylene Copolymerization Examples 1-2

Prepolymerization Treatment

Before introducing it into the polymerization reactors, the solid catalyst component described above is contacted with triethyl aluminum (TEAL) and methylcyclohexyldimethoxysilane (C donor) in a ratio reported on Table 1. The resulting mixture is subjected to prepolymerization by maintaining it in suspension in liquid propylene at 20° C. for about 5 minutes before introducing it into the polymerization reactor.

Polymerization

Copolymers are prepared by polymerizing propylene and ethylene in the presence of a catalyst under continuous conditions in a plant comprising a polymerization apparatus as described in EP Pat. Doc. No. 1 012 195. The catalyst is sent to the polymerization apparatus that comprises two interconnected cylindrical reactors, the riser and the downcomer. Fast fluidization conditions are established in the riser by recycling gas from the gas-solid separator. In Examples 1-2 no barrier feed has been used. The powder is continuously discharged and dried under a nitrogen flow. The main polymerization conditions are reported in Table 1. The characterization of the polymer is reported in Table 4.

TABLE 1

|  |  | Ex. 1 | Ex 2 a |
|---|---|---|---|
| Catalyst feed | g/h | 10 | 10 |
| Catalyst/TEAL | g/g | 6 | 6 |
| TEAL/C donor | g/g | 5 | 3 |
| Polymerization temperature | ° C. | 75 | 70 |
| Pressure | Bar-g | 28 | 27 |
| H$_2$/C$_3$ | mol/mol | 0.019 | 0.031 |
| C$_2$/C$_2$ + C$_3$ | mol/mol | 0.023 | 0.028 |
| Residence time | min | 66 | 79 |

C$_2$ = ethylene;
C$_3$ = propylene;
H$_2$ = hydrogen

Comparative Examples 3-5

Comparative Examples 3-5 are the repetition of Examples 1, 3 and 4 of U.S. Pat. No. 6,365,685, in which the X.S. of the resulting polymers has been determined according to the method given in the above characterization section. The results are reported in Table 2.

TABLE 2

| Comparative Example | 3 | 4 | 5 |
|---|---|---|---|
| C$_2$ wt % | 2.3 | 4 | 6 |
| XS wt % | 2.8 | 6.4 | 14.0 |
| C2x2.1-2.4 | 2.4 | 6.0 | 10.2 |

Comparative Example 6

Procedure for the Preparation of the Spherical Adduct

Microspheroidal MgCl$_2$.pC$_2$H$_5$OH adduct was prepared according to the method described in Comparative Example 5 of WIPO Pat. App. Pub. No. WO 98/440091. The adduct contains 11.2 wt. % of Mg.

Procedure for the Preparation of the Solid Catalyst Component

The solid catalyst component has been prepared according to the method described above.

Polymerization

Prepolymerization Treatment

Before introducing it into the polymerization reactors, the solid catalyst component described above is contacted with triethyl aluminum (TEAL) and methylcyclohexyldimethoxysilane (C donor) in the ratio reported on Table 1. Then the resulting mixture is subjected to prepolymerization by maintaining it in suspension in liquid propylene at 20° C. for about 5 minutes before introducing it into the polymerization reactor.

The polymerization run is conducted in continuous mode in a series of two reactors equipped with devices to transfer the product from one reactor to the one immediately next to it. The two reactors are loop liquid phase reactors. Hydrogen is used as a molecular weight regulator. The gas phase (propylene, ethylene and hydrogen) is continuously analyzed via gas chromatography. The polymerization conditions are reported in Table 3. The characterization of the polymer is reported on Table 4.

TABLE 3

| Loop reactor in liquid phase | |
|---|---|
| Catalyst feed g/h | 10 |
| Catalyst/TEAL g/g | 6 |
| TEAL/C donor | 3 |
| Temperature, ° C. | 67 |
| Pressure, bar | 34 |
| Residence time, min | 81 |
| H$_2$ feed mol ppm | 1500 |
| C2 feed (kg/h) | 2.3 |
| C2-loop wt % | 3.3 |
| Xylene solubles % | 6.2 |

C2 = ethylene;
C3 = propylene;
H$_2$ = hydrogen

TABLE 4

| Ex |  | 1 | 2 | Comp. Ex. 6 |
|---|---|---|---|---|
| MFR | g/10' | 13.2 | 9.3 | 11.6 |
| C2 | % | 3.0 | 4.0 | 3.3 |
| XS | % | 3.2 | 5.2 | 6.2 |
| Mw/Mn |  | 4.1 | 4.4 | >4.0 |
| C2x2.1-2.4 |  | 3.9 | 6.0 | 4.53 |
| Tm | ° C. | 144.1 | 139.1 | 144.0 |
| Characterization of cast film (50 micron) |  |  |  |  |

TABLE 4-continued

| Ex   |     | 1    | 2    | Comp. Ex. 6 |
|------|-----|------|------|-------------|
| Haze | %   | 0.19 | 0.14 | 0.19        |
| SIT  | ° C.| 123  | 118  | 124         |

From the results herein it is evident that the film obtained with the random compolymer according to the present disclosure shows a better haze and an higher difference between the melting point and the SIT.

What is claimed is:

1. A propylene/ethylene copolymer comprising:
an ethylene content of between 2.1 and 7.1% by weight;
a molecular weight distribution (MWD), expressed in terms of Mw/Mn, of greater than 4.0;
a content of xylene soluble fraction (XS) and ethylene content (C2) that fulfills the following relationship:

$$XS<(C2\times 2.1)-2.4$$

where:
XS=% by weight of the fraction soluble in xylene at 25° C.; and
C2=% by weight of ethylene units in the copolymer as determined via NMR,
wherein propylene/ethylene copolymer has a melt flow rate (MFR, 230° C., 2.16 kg) from 0.5 to 75 g/10 min.

2. The propylene/ethylene copolymer of claim 1, wherein the ethylene content is between 2.7 and 6.3 wt %.

3. The propylene/ethylene copolymer of claim 1, wherein the melt flow rate (MFR, 230° C. 2.16 kg) of the propylene/ethylene copolymer is from 2.0 to 25.0 g/10 min.

4. The propylene/ethylene copolymer of claim 1, wherein the content of the xylene soluble fraction (XS) and the ethylene content (C2) fulfill the following relationship:

$$XS<(C2\times 2.1)-2.6$$

where:
XS=% by weight of the fraction soluble in xylene at 25° C.; and
C2=% by weight of ethylene units in the copolymer as determined via NMR.

5. A cast film comprising the propylene/ethylene copolymer of claim 1.

* * * * *

UNITED STATES PATENT AND TRADEMARK OFFICE
CERTIFICATE OF CORRECTION

PATENT NO. : 10,155,827 B2
APPLICATION NO. : 15/309138
DATED : December 18, 2018
INVENTOR(S) : Massari et al.

Page 1 of 1

It is certified that error appears in the above-identified patent and that said Letters Patent is hereby corrected as shown below:

In the Specification

In Column 10, Line 53, delete "C2" and insert -- $C_2$ --, therefor

In Column 10, Line 54, delete "C3" and insert -- $C_3$ --, therefor

In Column 11, Line 8, delete "compolymer" and insert -- copolymer --, therefor

In Column 11, Line 9, delete "an" and insert -- a --, therefor

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*